United States Patent
Kim et al.

(10) Patent No.: US 9,639,204 B2
(45) Date of Patent: May 2, 2017

(54) TOUCH TYPE DISTINGUISHING METHOD AND TOUCH INPUT DEVICE PERFORMING THE SAME

(71) Applicant: HiDeep Inc., Gyeonggi-do (KR)

(72) Inventors: Seyeob Kim, Gyeonggi-do (KR); Yunjoung Kim, Gyeonggi-do (KR)

(73) Assignee: HiDeep Inc. (KR)

( * ) Notice: Subject to any disclaimer, the term of this patent is extended or adjusted under 35 U.S.C. 154(b) by 0 days.

(21) Appl. No.: 14/818,428

(22) Filed: Aug. 5, 2015

(65) Prior Publication Data
US 2016/0224171 A1 Aug. 4, 2016

(30) Foreign Application Priority Data
Feb. 4, 2015 (KR) .................. 10 2015 0017347

(51) Int. Cl.
- G06F 3/041 (2006.01)
- G06F 3/048 (2013.01)
- G06F 3/0488 (2013.01)
- G06F 3/044 (2006.01)

(52) U.S. Cl.
CPC ............ *G06F 3/0416* (2013.01); *G06F 3/044* (2013.01); *G06F 3/0412* (2013.01); *G06F 3/0414* (2013.01); *G06F 3/0488* (2013.01); *G06F 2203/04101* (2013.01); *G06F 2203/04105* (2013.01); *G06F 2203/04803* (2013.01)

(58) Field of Classification Search
CPC .............................. G06F 3/0416; G06F 3/0414
See application file for complete search history.

(56) References Cited

U.S. PATENT DOCUMENTS

| | | | | |
|---|---|---|---|---|
| 2006/0132455 A1* | 6/2006 | Rimas-Ribikauskas | | G06F 3/0414 345/173 |
| 2014/0145993 A1* | 5/2014 | Nakayama | ............ | G06F 3/0414 345/173 |
| 2014/0267114 A1* | 9/2014 | Lisseman | .............. | G06F 3/0488 345/173 |
| 2015/0268802 A1* | 9/2015 | Kim | ...................... | G06F 3/0482 715/763 |

FOREIGN PATENT DOCUMENTS

| | | |
|---|---|---|
| JP | 2014235479 | 5/2014 |
| JP | 2014182731 | 9/2014 |
| JP | 2015005173 | 1/2015 |
| KR | 1020100133246 | 12/2010 |

OTHER PUBLICATIONS

Corresponding Office Action issued by the KIPO on Sep. 17, 2015.
Corresponding Office Action issued by the JPO on Aug. 18, 2015.

* cited by examiner

*Primary Examiner* — Ariel Balaoing
(74) *Attorney, Agent, or Firm* — The Belles Group, P.C.

(57) ABSTRACT

A method for distinguishing a touch type in a touch input device including a touch screen may be provided that includes: determining whether a touch on the touch screen includes a time interval during which the touch has a pressure greater than a first pressure within a first time period; and distinguishing the touch type in accordance with whether or not the touch includes a time interval during which the touch has a pressure greater than the first pressure within the first time period.

12 Claims, 14 Drawing Sheets

TOUCH TYPE DISTINGUISHING METHOD AND TOUCH INPUT DEVICE PERFORMING THE SAME

CROSS REFERENCE TO RELATED APPLICATIONS

Priority is claimed under 35 U.S.C. §119 to Korean Patent Application No.: 10-2015-0017347, filed Feb. 4, 2015, the disclosure of which is incorporated herein by reference in its entirety.

FIELD OF THE INVENTION

The present disclosure relates to a touch type distinguishing method and a touch input device performing the same, and more particularly to a technology which clarifies a criterion for distinguishing between a long touch and a pressure touch in one touch input device, thereby overcoming problems caused by the two confusing touches.

BACKGROUND OF THE INVENTION

A variety of input devices are being used to operate a computing system. For example, input devices like a button, a key, a joystick and a touch screen are being used. Since the touch screen is easy and simple to operate, the touch screen is increasingly being used in operation of the computing system.

The touch screen may include a touch sensor panel which may be a transparent panel including a touch-sensitive surface. Such a touch sensor panel is attached to the front side of a display panel, and then the touch-sensitive surface may cover the visible side of the display panel. The touch screen allows a user to operate the computing system by simply touching the screen by a finger, etc. In general, the touch screen recognizes the touch on the panel and touch position, and then the computing system analyzes the touch and performs operations in accordance with the analysis.

A variety of tasks can be done by the interaction between the user and the device through the touch screen in a touch input device including the touch screen. To accomplish various tasks, there is a need to distinguish between a long time touch as well as a simple touch on the touch screen and a pressure touch which has a different input value according to the size of the pressure.

SUMMARY OF THE INVENTION

One embodiment is a touch input device which may include a touch screen and may be configured to perform mutually different operations with respect to a first touch which occurs on the touch screen and is maintained during a time period equal to or greater than a first time period, wherein the first touch is maintained at a pressure less than a first pressure within the first time period, and a second touch which occurs on the touch screen and includes a time interval having a pressure greater than the first pressure within the first time period.

Another embodiment is a method for distinguishing a touch type in a touch input device including a touch screen. The method may include: determining whether a touch on the touch screen includes a time interval during which the touch has a pressure greater than a first pressure within a first time period; and distinguishing the touch type in accordance with whether or not the touch includes a time interval during which the touch has a pressure greater than the first pressure within the first time period.

Further another embodiment is a touch input device capable of distinguishing a touch type. The touch input device may include a touch screen; and a controller. The controller may perform determining whether a touch on the touch screen includes a time interval during which the touch has a pressure greater than a first pressure within a first time period; and distinguishing the touch type in accordance with whether or not the touch includes a time interval during which the touch has a pressure greater than the first pressure within the first time period.

DETAILED DESCRIPTION OF THE INVENTION

Figure 1:
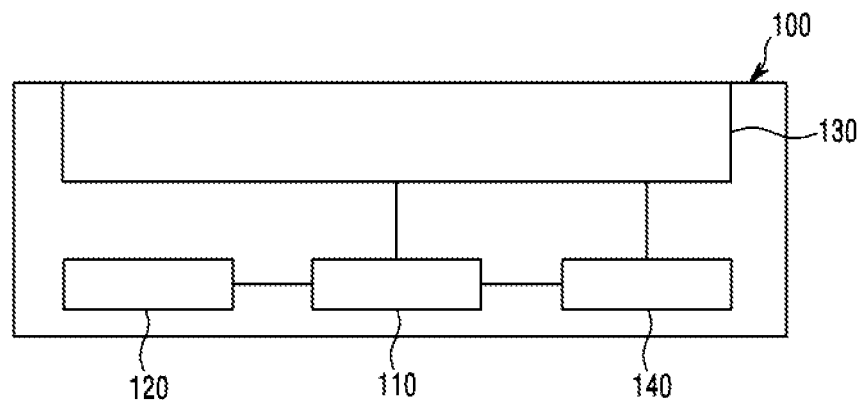
FIG. 1 is a structure view of a touch input device according to an embodiment of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. The following detailed description is not intended to be limited. If adequately described, the scope of the present invention is limited only by the appended claims of the present invention as well as all equivalents thereto. Similar reference numerals in the drawings designate the same or similar functions in many aspects.

Hereafter, a touch input device 100 including a touch screen 130 according to the embodiment of the present invention will be described with reference to the accompanying drawings. Prior to the description of a method for distinguishing between a long touch and a pressure touch in accordance with the embodiment of the present invention, the touch screen 130 included in the touch input device 100 will be described in detail with reference to FIGS. 8 to 16.

Figure 8:
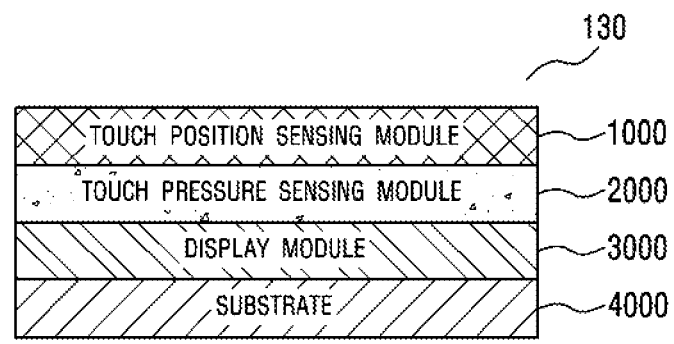
FIG. 8 shows a structure of a touch screen according to a first embodiment.

FIG. 8 shows a structure of the touch screen according to a first embodiment.

As shown in FIG. 8, the touch screen 130 may include a touch position sensing module 1000, a touch pressure sensing module 2000 disposed under the touch position sensing module 1000, a display module 3000 disposed under the touch pressure sensing module 2000, and a substrate 4000 disposed under the display module 3000. For example, the touch position sensing module 1000 and the touch pressure sensing module 2000 may be a transparent panel including a touch-sensitive surface. Hereafter, the modules 1000, 2000, 3000 and 5000 for sensing the touch position and/or touch pressure may be collectively designated as a touch sensing module.

The display module 3000 is able to display the screen to allow a user to visually check contents. Here, the display module 3000 may display by means of a display driver. The display driver (not shown) is a software allowing an operating system to manage or control a display adaptor and is a kind of a device driver.

Figure 16A:
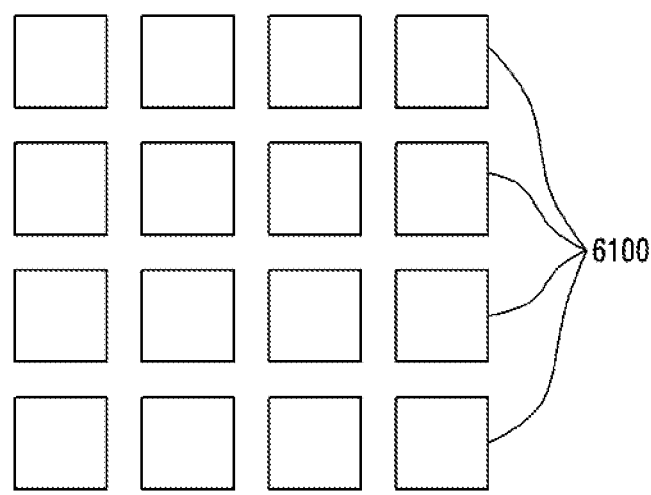
FIGS. 16a to 16d are structure views showing the shape of an electrode formed in the touch sensing module according to the embodiment.
Figure 16B:
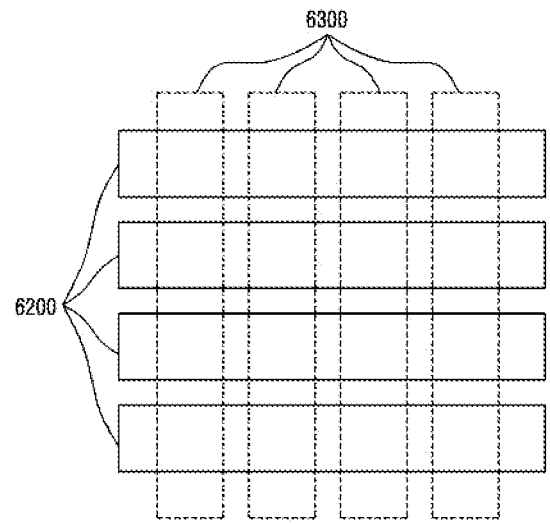
Figure 16C:
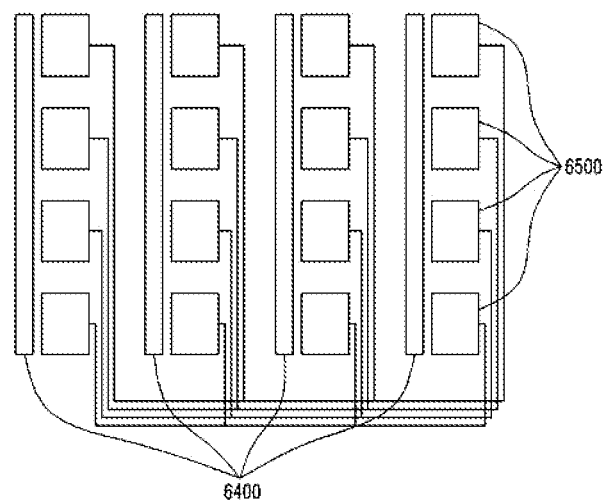

FIGS. 9a to 9d show a structure of the touch position sensing module according to the first embodiment. FIGS. 16a to 16c are structure views showing the shape of an electrode formed in the touch position sensing module according to the embodiment.

Figure 9A:
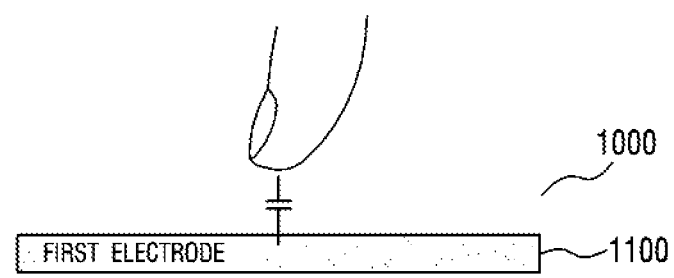
FIGS. 9a to 9d show a structure of a touch position sensing module of the touch screen according to the first embodiment.

As shown in FIG. 9a, the touch position sensing module 1000 according to the embodiment may include a first electrode 1100 formed in one layer. Here, the first electrode 1100 may be, as shown in FIG. 16a, comprised of a plurality of electrodes 6100, and then a driving signal may be input to each electrode 6100 and a sensing signal including information on self-capacitance may be output from each electrode. When an object like a user's finger approaches the first electrode 1100, the finger functions as a ground and the self-capacitance of the first electrode 1100 is changed. Therefore, the touch input device 100 is able to detect the touch position by measuring the self-capacitance of the first electrode 1100, which is changed as the object like the user's finger approaches the touch screen 130.

Figure 9B:
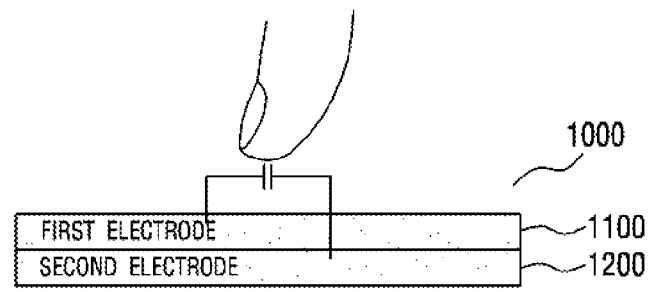

As shown in FIG. 9b, the touch position sensing module 1000 according to the embodiment may include the first electrode 1100 and a second electrode 1200, which are formed on different layers.

Figure 9C:
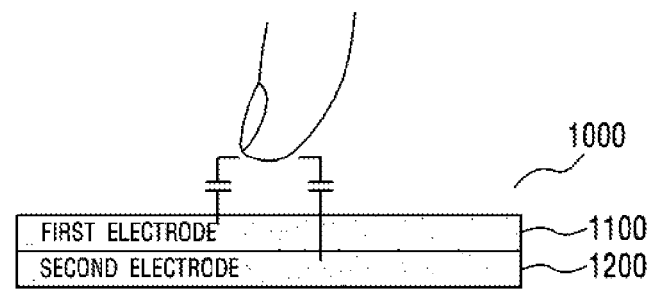

Here, the first and the second electrodes 1100 and 1200 are, as shown in FIG. 16b, comprised of a plurality of first electrodes 6200 and a plurality of second electrodes 6300 respectively. The plurality of first electrodes 6200 and the plurality of second electrodes 6300 may be arranged to cross each other. A driving signal may be input to any one of the first electrode 6200 and the second electrode 6300, and a sensing signal including information on mutual capacitance may be output from the other. As shown in FIG. 9b, when the object like the user's finger approaches the first electrode 1100 and the second electrode 1200, the finger functions as a ground, so that the mutual capacitance between the first electrode 1100 and the second electrode 1200 is changed. In this case, the touch input device 100 measures the mutual capacitance between the first electrode 1100 and the second electrode 1200, which is changed with the approach of the object like the user's finger to the touch screen 130, and then detects the touch position. Also, the driving signal may be input to the first electrode 6200 and the second electrode 6300, and a sensing signal including information on the self-capacitance may be output from the first and second electrodes 6200 and 6300 respectively. As shown in FIG. 9c, when the object like the user's finger approaches the first electrode 1100 and the second electrode 1200, the finger functions as a ground, so that the self-capacitance of each of the first and second electrodes 1100 and 1200 is changed. In this case, the touch input device 100 measures the self-capacitances of the first electrode 1100 and the second electrode 1200, which is changed with the approach of the object like the user's finger to the touch screen 130, and then detects the touch position.

Figure 9D:
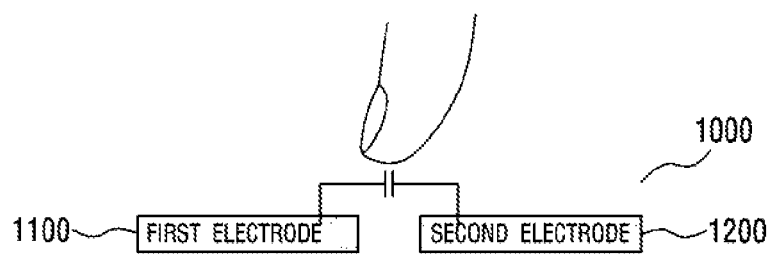

As shown in FIG. 9d, the touch position sensing module 1000 according to the embodiment may include the first electrode 1100 formed in one layer and the second electrode 1200 formed in the same layer as the layer in which the first electrode 1100 has been formed.

Here, the first and the second electrodes 1100 and 1200 are, as shown in FIG. 16c, comprised of a plurality of first electrodes 6400 and a plurality of second electrodes 6500 respectively. The plurality of first electrodes 6400 and the plurality of second electrodes 6500 may be arranged without crossing each other and may be arranged such that the plurality of second electrodes 6500 are connected to each other in a direction crossing the extension direction of the each first electrodes 6400. A principle of detecting the touch position by using the first electrode 6400 or the second electrode 6500 shown in FIG. 9d is the same as that of the foregoing referring to FIG. 9c, and thus a description of the principle will be omitted.

FIGS. 10a to 10f show a structure of the touch pressure sensing module according to the first embodiment. FIGS. 16a to 16d are structure views showing the shape of the electrode formed in the touch pressure sensing module 2000 according to the embodiment.

As shown in FIGS. 10a to 10f, the touch pressure sensing module 2000 according to the first embodiment may include a spacer layer 2400. The spacer layer 2400 may be implemented by an air gap. The spacer may be comprised of an impact absorbing material according to the embodiment and may be also filled with a dielectric material according to the embodiment.

As shown in FIGS. 10a to 10d, the touch pressure sensing module 2000 according to the first embodiment may include a reference potential layer 2500. The reference potential layer 2500 may have any potential. For example, the reference potential layer may be a ground layer having a ground potential. Here, the reference potential layer may include a layer which is parallel with a two-dimensional plane in which a below-described first electrode 2100 for sensing the touch pressure has been formed or a two-dimensional plane in which a below-described second electrode 2200 for sensing the touch pressure has been formed. Although it has been described in FIGS. 10a to 10d that the touch pressure sensing module 2000 includes the reference potential layer 2500, there is no limit to this. The touch pressure sensing module 2000 does not include the reference potential layer 2500, and the display module 3000 or the substrate 4000 which is disposed under the touch pressure sensing module 2000 may function as the reference potential layer.

Figure 10A:
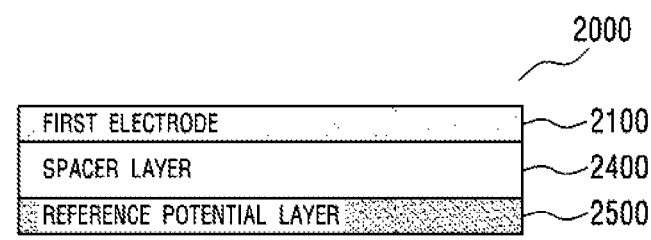
FIGS. 10a to 10f show a structure of a touch pressure sensing module of the touch screen according to the first embodiment.

As shown in FIG. 10a, the touch pressure sensing module 2000 according to the embodiment may include the first electrode 2100 formed in one layer, the spacer layer 2400 formed under the layer in which the first electrode 2100 has been formed, and the reference potential layer 2500 formed under the spacer layer 2400.

Figure 10B:
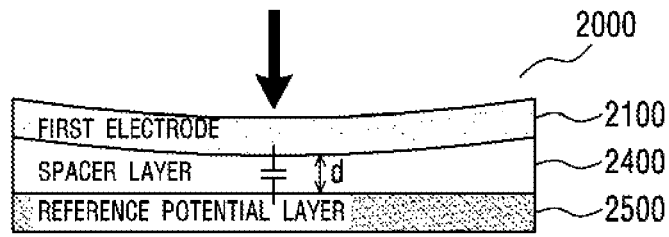
Figure 16D:
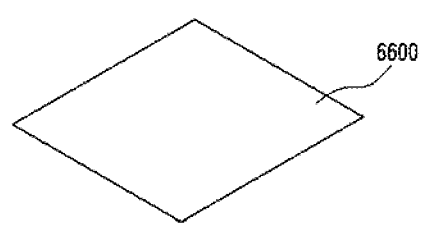

Here, the first electrode 2100 is, as shown in FIG. 16a, comprised of the plurality of electrodes 6100. Then, the driving signal may be input to each of the electrodes 6100 and the sensing signal including information on the self-capacitance may be output from the each electrode. When a pressure is applied to the touch screen 130 by the object like the user's finger or stylus, the first electrode 2100 is, as shown in FIG. 10b, curved at least at the touch position, so that a distance "d" between the first electrode 2100 and the reference potential layer 2500 is changed, and thus, the self-capacitance of the first electrode 2100 is changed. Accordingly, the touch input device 100 is able to detect the touch pressure by measuring the self-capacitance of the first electrode 2100, which is changed by the pressure that the object like the user's finger or stylus applies to the touch screen 130. As such, since the first electrode 2100 is comprised of the plurality of electrodes 6100, the touch input device 100 is able to detect the pressure of each of multiple touches which have been simultaneously input to the touch screen 130. Also, when there is no requirement for detecting the pressure of each of multiple touches, it is only required to detect overall pressure applied to the touch screen 130 irrespective of the touch position. Therefore, the first electrode 2100 of the touch pressure sensing module 2000 may be, as shown in FIG. 16d, comprised of one electrode 6600.

Figure 10C:
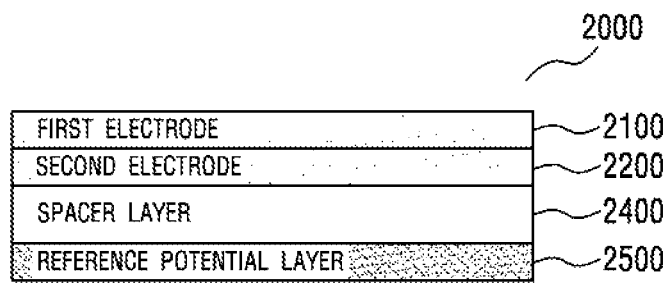

As shown in FIG. 10c, the touch pressure sensing module 2000 according to the embodiment may include the first electrode 2100, the second electrode 2200 formed under the layer in which the first electrode 2100 has been formed, the spacer layer 2400 formed under the layer in which the second electrode 2200 has been formed, and the reference potential layer 2500 formed under the spacer layer 2400.

Figure 10D:
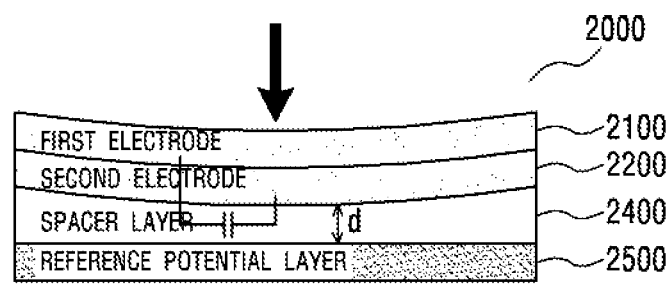

Here, the first electrode 2100 and the second electrode 2200 may be configured and arranged as shown in FIG. 18b. A driving signal is input to any one of the first electrode 6200 and the second electrode 6300, and a sensing signal including information on the mutual capacitance may be output from the other. When a pressure is applied to the touch screen 130, the first electrode 2100 and the second electrode 2200 are, as shown in FIG. 10d, curved at least at the touch position, so that a distance "d" between the reference potential layer 2500 and both the first electrode 2100 and the second electrode 2200 is changed, and thus, the mutual capacitance between the first electrode 2100 and the second electrode 2200 is changed. Accordingly, the touch input device 100 is able to detect the touch pressure by measuring the mutual capacitance between the first electrode 2100 and the second electrode 2200, which is changed by the pressure that is applied to the touch screen 130. As such, since the first electrode 2100 and the second electrode 2200 are comprised of the plurality of first electrodes 6200 and the plurality of second electrodes 6300 respectively, the touch input device 100 is able to detect the pressure of each of multiple touches which have been simultaneously input to the touch screen 130. Also, when there is no requirement for detecting the pressure of each of multiple touches, at least one of the first electrode 2100 and the second electrode 2200 of the touch pressure sensing module 2000 may be, as shown in FIG. 16d, comprised of the one electrode 6600.

Here, even when the first electrode 2100 and the second electrode 2200 are formed in the same layer, the touch pressure can be also detected as described in FIG. 10c. The first electrode 2100 and the second electrode 2200 may be configured and arranged as shown in FIG. 16c, or may be comprised of the one electrode 6600 as shown in FIG. 16d.

Figure 10E:
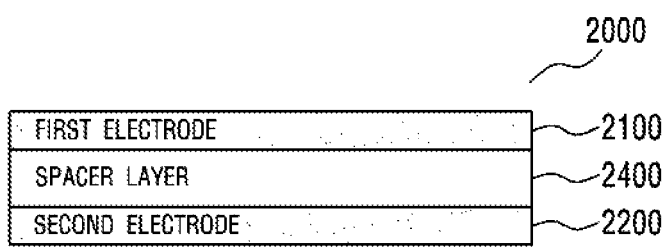

As shown in FIG. 10e, the touch pressure sensing module 2000 according to the embodiment may include the first electrode 2100 formed in one layer, the spacer layer 2400 formed under the layer in which the first electrode 2100 has been formed, and the second electrode 2200 formed under the spacer layer 2400.

Figure 10F:
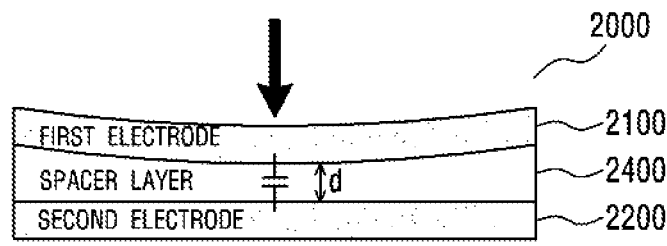

In FIG. 10e, the configuration and operation of the first electrode 2100 and the second electrode 2200 are the same as those of the foregoing referring to FIG. 10c, and thus, a description of the configuration and operation will be omitted. When a pressure is applied to the touch screen 130, the first electrode 2100 is, as shown in FIG. 10f, curved at least at the touch position, so that a distance "d" between the first electrode 2100 and the second electrode 2200 is changed, and thus, the mutual capacitance between the first electrode 2100 and the second electrode 2200 is changed. Accordingly, the touch input device 100 is able to detect the touch pressure by measuring the mutual capacitance between the first electrode 2100 and the second electrode 2200.

Figure 11:
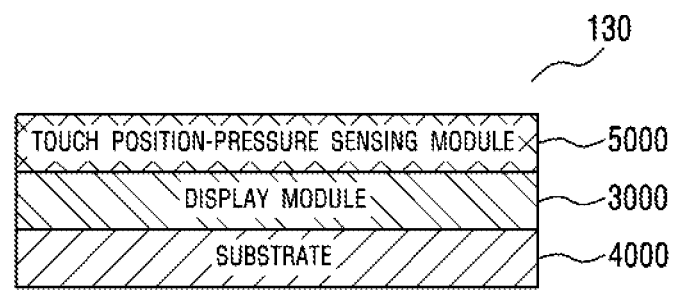
FIG. 11 shows a structure of the touch screen according to a second embodiment.

As shown in FIG. 11, a touch screen 130 according to a second embodiment may include a touch position-pressure sensing module 5000, a display module 3000 disposed under the touch position-pressure sensing module 5000, and a substrate 4000 disposed under the display module 3000.

Unlike the embodiment shown in FIG. 8, the touch position-pressure sensing module 5000 according to the embodiment shown in FIG. 11 includes at least one electrode for sensing the touch position, and at least one electrode for sensing the touch pressure. At least one of the electrodes is used to sense both the touch position and the touch pressure. As such, the electrode for sensing the touch position and the electrode for sensing the touch pressure are shared, so that it is possible to reduce the manufacturing cost of the touch position-pressure sensing module, to reduce the overall thickness of the touch screen 130 and to simplify the manufacturing process. In the sharing of the electrode for sensing the touch position and the electrode for sensing the touch pressure, when it is necessary to distinguish between the sensing signal including information on the touch position and the sensing signal including information on the touch pressure, it is possible to distinguish and sense the touch position and the touch pressure by differentiating a frequency of the driving signal for sensing the touch position from a frequency of the driving signal for sensing the touch pressure, or by differentiating a time interval for sensing the touch position from a time interval for sensing the touch pressure.

FIGS. 12a to 12k show a structure of the touch position-pressure sensing module according to the second embodiment. As shown in FIGS. 12a to 12k, the touch position-pressure sensing module 5000 according to the second embodiment may include a spacer layer 5400.

As shown in FIGS. 12a to 12i, the touch position-pressure sensing module 5000 according to the embodiment may include a reference potential layer 5500. The reference potential layer 5500 is the same as that of the foregoing referring to FIGS. 10*a* to 10*d*, and thus, a description of the reference potential layer 5500 will be omitted. The reference potential layer may include a layer which is parallel with a two-dimensional plane in which a below-described first electrode 5100 for sensing the touch pressure has been formed, a two-dimensional plane in which a below-described second electrode 5200 for sensing the touch pressure has been formed, or a two-dimensional plane in which a below-described third electrode 5300 for sensing the touch pressure has been formed.

Figure 12A:
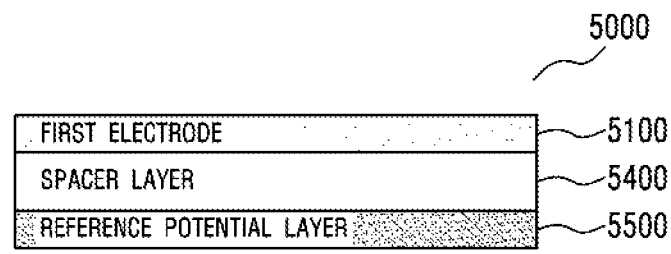
FIGS. 12a to 12k show a structure of a touch position-pressure sensing module of the touch screen according to the second embodiment.

As shown in FIG. 12*a*, the touch position-pressure sensing module 5000 according to the embodiment may include the first electrode 5100 formed in one layer, the spacer layer 5400 formed under the layer in which the first electrode 5100 has been formed, and the reference potential layer 5500 formed under the spacer layer 5400.

Figure 12B:
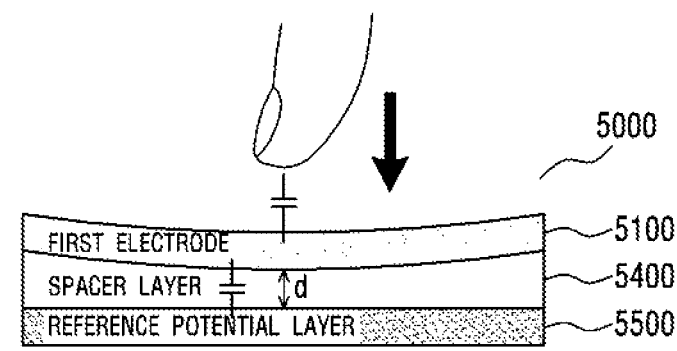

A description of the configuration of FIGS. 12*a* and 12*b* is similar to the description referring to FIGS. 10*a* and 10*b*. Hereafter, only the difference between them will be described. As shown in FIG. 12*b*, when the object like the user's finger approaches the first electrode 5100, the finger functions as a ground and the touch position can be detected by the change of the self-capacitance of the first electrode 5100. Also, when a pressure is applied to the touch screen 130 by the object, a distance "d" between the first electrode 5100 and the reference potential layer 5500 is changed, and thus, the touch pressure can be detected by the change of the self-capacitance of the first electrode 5100.

Figure 12C:
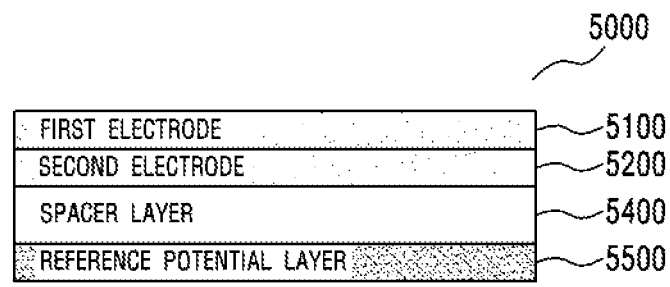

As shown in FIG. 12*c*, the touch position-pressure sensing module 5000 according to the embodiment may include the first electrode 5100 formed in one layer, the second electrode 5200 formed in a layer under the layer in which the first electrode 5100 has been formed, the spacer layer 5400 formed under the layer in which the second electrode 5200 has been formed, and the reference potential layer 5500 formed under the spacer layer 5400.

Figure 12D:
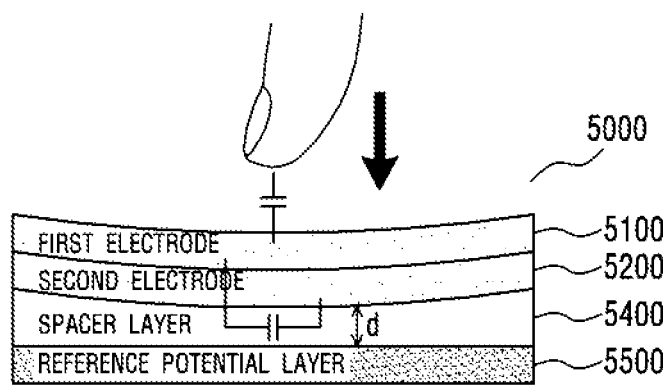

A description of the configuration of FIGS. 12*c* to 12*f* is similar to the description referring to FIGS. 10*c* and 10*d*. Hereafter, only the difference between them will be described. Here, the first electrode 5100 and the second electrode 5200 may be, as shown in FIG. 16*a*, comprised of the plurality of electrodes 6100 respectively. As shown in FIG. 12*d*, when the object like the user's finger approaches the first electrode 5100, the finger functions as a ground and the touch position can be detected by the change of the self-capacitance of the first electrode 5100. Also, when a pressure is applied to the touch screen 130 by the object, a distance "d" between the reference potential layer 5500 and both the first electrode 5100 and the second electrode 5200 is changed, and thus, the touch pressure can be detected by the change of the mutual capacitance between the first electrode 5100 and the second electrode 5200.

Also, according to the embodiment, each of the first and second electrodes 5100 and 5200 may be, as shown in FIG. 16*b*, comprised of the plurality of first electrodes 6200 and the plurality of second electrodes 6300. The plurality of first electrodes 6200 and the plurality of second electrodes 6300 may be arranged to cross each other. Here, the touch position can be detected by the change of the mutual capacitance between the first electrode 5100 and the second electrode 5200, and the touch pressure can be detected by the change of the self-capacitance of the second electrode 5200 according to the change of a distance "d" between the second electrode 5200 and the reference potential layer 5500. Also, according to the embodiment, the touch position can be detected by the change of the mutual capacitance between the first electrode 5100 and the second electrode 5200, and also, the touch pressure can be detected by the change of the mutual capacitance between the first electrode 5100 and the second electrode 5200 according to the change of the distance "d" between the reference potential layer 5500 and both the first electrode 5100 and the second electrode 5200.

Here, even when the first electrode 5100 and the second electrode 5200 are formed in the same layer, the touch position and touch pressure can be also detected as described with reference to FIGS. 12*c* and 12*d*. However, in FIGS. 12*c* and 12*d*, regarding the embodiment where the electrode should be configured as shown in FIG. 16*b*, when the first electrode 5100 and the second electrode 5200 are formed in the same layer, the first electrode 5100 and the second electrode 5200 may be configured as shown in FIG. 16*c*.

Figure 12E:
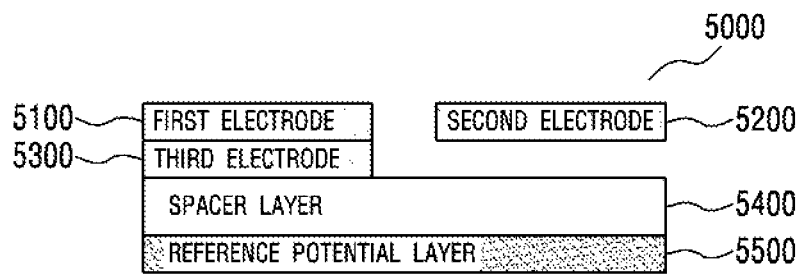

As shown in FIG. 12*e*, the touch position-pressure sensing module 5000 according to the embodiment may include the first electrode 5100 and the second electrode 5200 which have been in the same layer, the third electrode 5300 which has been formed in a layer under the layer in which the first electrode 5100 and the second electrode 5200 have been formed, the spacer layer 5400 formed under the layer in which the third electrode 5300 has been formed, and the reference potential layer 5500 formed under the spacer layer 5400.

Figure 12F:
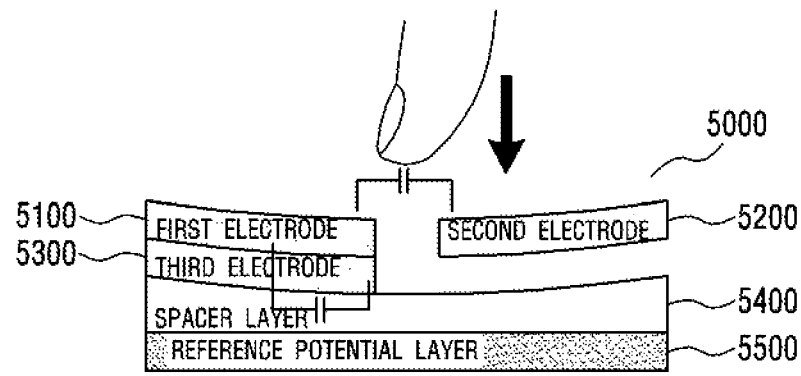

Here, the first electrode 5100 and the second electrode 5200 may be configured and arranged as shown in FIG. 16*c*, and the first electrode 5100 and the third electrode 5300 may be configured and arranged as shown in FIG. 16*b*. As shown in FIG. 12*f*, when the object like the user's finger approaches the first electrode 5100 and the second electrode 5200, the mutual capacitance between the first electrode 5100 and the second electrode 5200 is changed, so that the touch position can be detected. When a pressure is applied to the touch screen 130 by the object, a distance "d" between the reference potential layer 5500 and both the first electrode 5100 and the third electrode 5300 is changed, and then the mutual capacitance between the first electrode 5100 and the third electrode 5300 is hereby changed, so that the touch pressure can be detected. Also, according to the embodiment, the touch position can be detected by the change of the mutual capacitance between the first electrode 5100 and the third electrode 5300, and the touch pressure can be detected by the change of the mutual capacitance between the first electrode 5100 and the second electrode 5200.

Figure 12G:
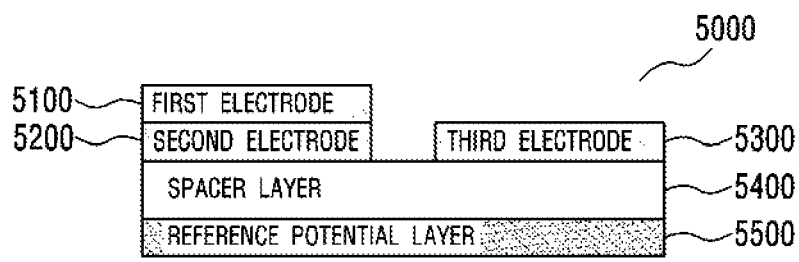

As shown in FIG. 12*g*, the touch position-pressure sensing module 5000 according to the embodiment may include the first electrode 5100 formed in one layer, the second electrode 5200 formed in a layer under the layer in which the first electrode 5100 has been formed, the third electrode 5300 formed in the same layer as the layer in which the second electrode 5200 has been formed, the spacer layer 5400 formed under the layer in which the second electrode 5200 and the third electrode 5300 have been formed, and the reference potential layer 5500 formed under the spacer layer 5400.

Figure 12H:
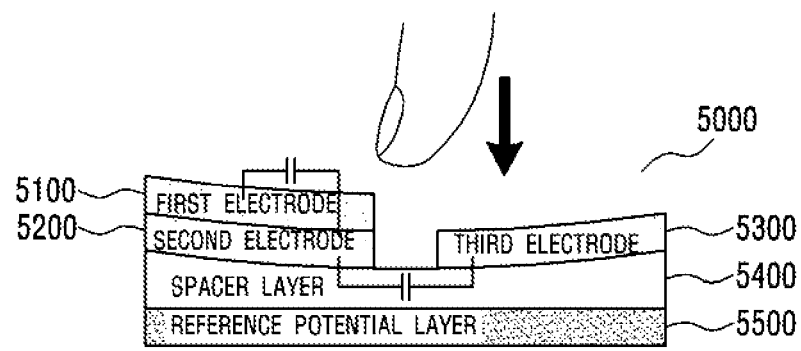

Here, the first electrode 5100 and the second electrode 5200 may be configured and arranged as shown in FIG. 16*b*, and the second electrode 5200 and the third electrode 5300 may be configured and arranged as shown in FIG. 16*c*. In FIG. 12*h*, the touch position can be detected by the change of the mutual capacitance between the first electrode 5100 and the second electrode 5200, and the touch pressure can be detected by the change of the mutual capacitance between the second electrode 5200 and the third electrode 5300. Also, according to the embodiment, the touch position can be detected by the change of the mutual capacitance between the first electrode 5100 and the third electrode 5300, and the touch pressure can be detected by the change of the mutual capacitance between the first electrode 5100 and the second electrode 5200.

Figure 12I:
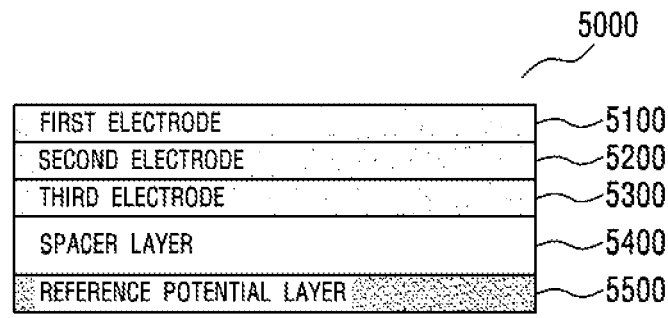

As shown in FIG. 12*i*, the touch position-pressure sensing module 5000 according to the embodiment may include the first electrode 5100 formed in one layer, the second electrode 5200 formed in a layer under the layer in which the first electrode 5100 has been formed, the third electrode 5300 formed under the layer in which the second electrode 5200 has been formed, the spacer layer 5400 formed under the layer in which the third electrode 5300 has been formed, and the reference potential layer 5500 formed under the spacer layer 5400.

Here, the first electrode 5100 and the second electrode 5200 may be configured and arranged as shown in FIG. 16*b*, and the second electrode 5200 and the third electrode 5300 may be also configured and arranged as shown in FIG. 16*b*. Here, when the object like the user's finger approaches the first electrode 5100 and the second electrode 5200, the finger functions as a ground and the touch position can be detected by the change of the mutual capacitance between the first electrode 5100 and the second electrode 5200. Also, when a pressure is applied to the touch screen 130 by the object, a distance "d" between the reference potential layer 5500 and both the second electrode 5200 and the third electrode 5300 is changed, so that the touch pressure can be detected by the change of the mutual capacitance between the second electrode 5200 and the third electrode 5300. Also, according to the embodiment, when the object like the user's finger approaches the first electrode 5100 and the second electrode 5200, the finger functions as a ground, so that the touch position can be detected by the change of the self-capacitance of each of the first and second electrodes 5100 and 5200.

Figure 12J:
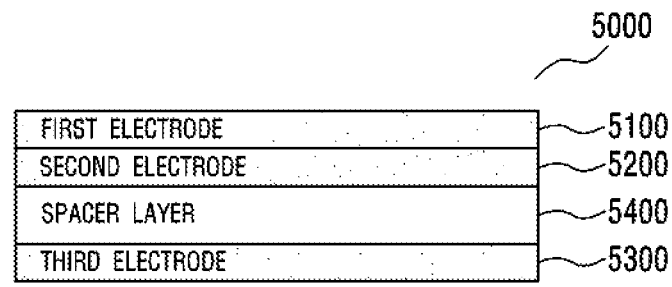

As shown in FIG. 12*j*, the touch position-pressure sensing module 5000 according to the embodiment may include the first electrode 5100 formed in one layer, the second electrode 5200 formed in a layer under the layer in which the first electrode 5100 has been formed, the spacer layer 5400 formed under the layer in which the second electrode 5200 has been formed, and the third electrode 5300 formed under the spacer layer 5400.

Here, the first electrode 5100 and the second electrode 5200 may be configured and arranged as shown in FIG. 16*b*, and the third electrode 5300 may be configured as shown in FIG. 16*a* or the second electrode 5200 and the third electrode 5300 may be also configured and arranged as shown in FIG. 16*b*. Here, when the object like the user's finger approaches the first electrode 5100 and the second electrode 5200, the finger functions as a ground and the touch position can be detected by the change of the mutual capacitance between the first electrode 5100 and the second electrode 5200. Also, when a pressure is applied to the touch screen 130 by the object, a distance "d" between the second electrode 5200 and the third electrode 5300 is changed, so that the touch pressure can be detected by the change of the mutual capacitance between the second electrode 5200 and the third electrode 5300. Also, according to the embodiment, when the object like the user's finger approaches the first electrode 5100 and the second electrode 5200, the finger functions as a ground, so that the touch position can be detected by the change of the self-capacitance of each of the first and second electrodes 5100 and 5200.

Figure 12K:
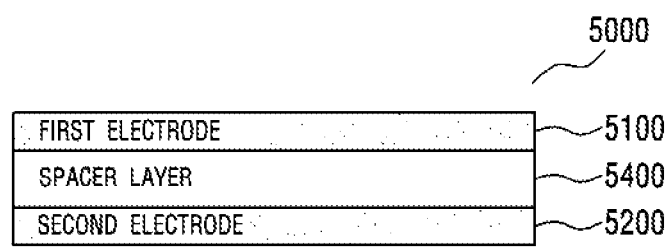

As shown in FIG. 12*k*, the touch position-pressure sensing module 5000 according to the embodiment may include the first electrode 5100 formed in one layer, the spacer layer 5400 formed under the layer in which the first electrode 5100 has been formed, and the second electrode 5200 formed under the spacer layer 5400.

Here, the first electrode 5100 and the second electrode 5200 may be configured and arranged as shown in FIG. 16*b*. Here, the touch position can be detected by the change of the mutual capacitance between the first electrode 5100 and the second electrode 5200. Also, when a pressure is applied to the touch screen 130 by the object, a distance "d" between the first electrode 5100 and the second electrode 5200 is changed, so that the touch pressure can be detected by the change of the mutual capacitance between the first electrode 5100 and the second electrode 5200. The first electrode 5100 and the second electrode 5200 may be configured and arranged as shown in FIG. 16*a*. Here, when the object like the user's finger approaches the first electrode 5100, the finger functions as a ground and the self-capacitance of the first electrode 5100 is changed, so that the touch position can be detected. Also, the touch pressure can be detected by the change of the mutual capacitance between the first electrode 5100 and the second electrode 5200.

Figure 13:
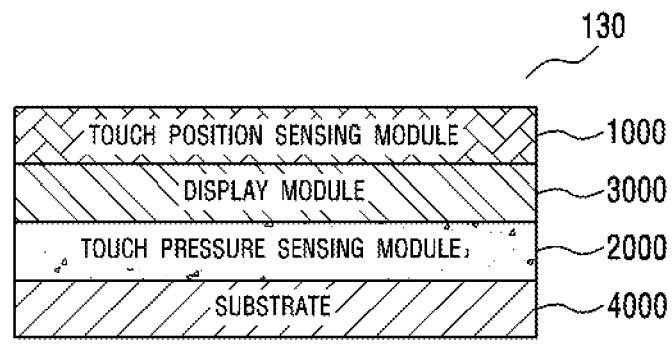
FIG. 13 shows a structure of the touch screen according to a third embodiment.

As shown in FIG. 13, a touch screen 130 according to a third embodiment may include the touch position sensing module 1000, the display module 3000 disposed under the touch position sensing module 1000, the touch pressure sensing module 2000 disposed under the display module 3000, and the substrate 4000 disposed under the touch pressure sensing module 2000.

In the touch screens 130 according to the embodiment shown in FIGS. 8 and 11, since the touch pressure sensing module 2000 which includes the spacer layer 2400 or the touch position-pressure sensing module 5000 which includes the spacer layer 5400 is disposed on the display module 3000, the color clarity, visibility, optical transmittance of the display module 3000 may be reduced. Therefore, in order to prevent such problems, the touch position sensing module 1000 and the display module 3000 are fully laminated by using an adhesive like an optically clear adhesive (OCA), and the touch pressure sensing module 2000 is disposed under the display module 3000. As a result, the aforementioned problem can be alleviated and solved. Also, an existing gap formed between the display module 3000 and the substrate 4000 is used as the spacer layer for detecting the touch pressure, so that the overall thickness of the touch screen 130 can be reduced.

The touch position sensing module 1000 according to the embodiment shown in FIG. 13 is the same as the touch position sensing module shown in FIGS. 9*a* to 9*d*.

Figure 14A:
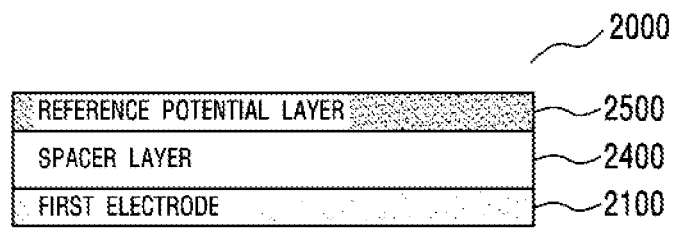
FIGS. 14a to 14b show a touch pressure sensing module of the touch screen according to the third embodiment.
Figure 14B:
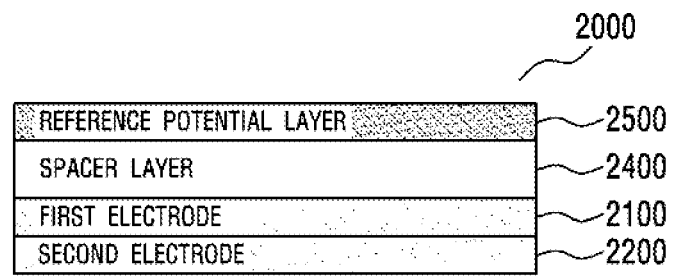

The touch pressure sensing module 2000 according to the embodiment shown in FIG. 13 may be the touch pressure sensing module shown in FIGS. 10*a* to 10*f* and the touch pressure sensing module shown in FIGS. 14*a* to 14*b*.

As shown in FIG. 14*a*, the touch pressure sensing module 2000 according to the embodiment may include the reference potential layer 2500, the spacer layer 2400 formed under the reference potential layer 2500, and the first electrode 2100 formed under the spacer layer 2400. Since the configuration and operation of FIG. 14*a* are the same as those of FIGS. 10*a* and 10*b* with the exception of the fact that the position of the reference potential layer 2500 and the position of the first electrode 2100 are replaced with each other, repetitive descriptions thereof will be omitted hereafter.

As shown in FIG. 14*b*, the touch pressure sensing module 2000 according to the embodiment may include the reference potential layer 2500, the spacer layer 2400 formed under the ground, the first electrode 2100 formed in a layer under the spacer layer 2400, and the second electrode 2200 formed in a layer under the layer in which the first electrode 2100 has been formed. Since the configuration and operation of FIG. 14*b* are the same as those of FIGS. 10*c* and 10*d* with the exception of the fact that the position of the reference potential layer 2500, the position of the first electrode 2100 and the position of the second electrode 2200 are replaced with each other, repetitive descriptions thereof will be omitted hereafter. Here, even when the first electrode 2100 and the second electrode 2200 are formed in the same layer, the touch pressure can be detected as described in FIGS. 10*c* and 10*d*.

Although it has been described in FIG. 13 that the display module 3000 is disposed under the touch position sensing module 1000, the touch position sensing module 1000 can be included within the display module 3000. Also, although it has been described in FIG. 13 that the touch pressure sensing module 2000 is disposed under the display module 3000, a portion of the touch pressure sensing module 2000 can be included within the display module 3000. Specifically, the reference potential layer 2500 of the touch pressure sensing module 2000 may be disposed within the display module 3000, and the electrodes 2100 and 2200 may be formed under the display module 3000. As such, when the reference potential layer 2500 is disposed within the display module 3000, a gap formed within the display module 3000 is used as the spacer layer for detecting the touch pressure, so that the overall thickness of the touch screen 130 can be reduced. Here, the electrodes 2100 and 2200 may be formed on the substrate 4000. As such, when the electrodes 2100 and 2200 are formed on the substrate 4000, not only the gap formed within the display module 3000 but also the gap formed between the display module 3000 and the substrate 4000 is used as the spacer layer for detecting the touch pressure, so that the sensitivity for detecting the touch pressure can be more improved.

Figure 15A:
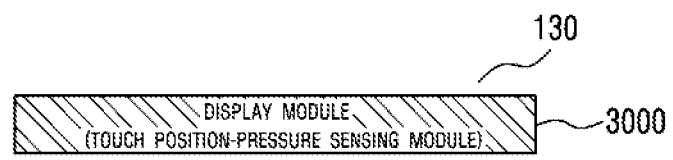
FIG. 15a shows a structure of the touch screen according to a fourth embodiment.

FIG. 15*a* shows a structure of the touch screen according to a fourth embodiment. As shown in FIG. 15*a*, the touch screen 130 according to the fourth embodiment may include at least one of the touch position sensing module and the touch pressure sensing module within the display module 3000.

Figure 15B:
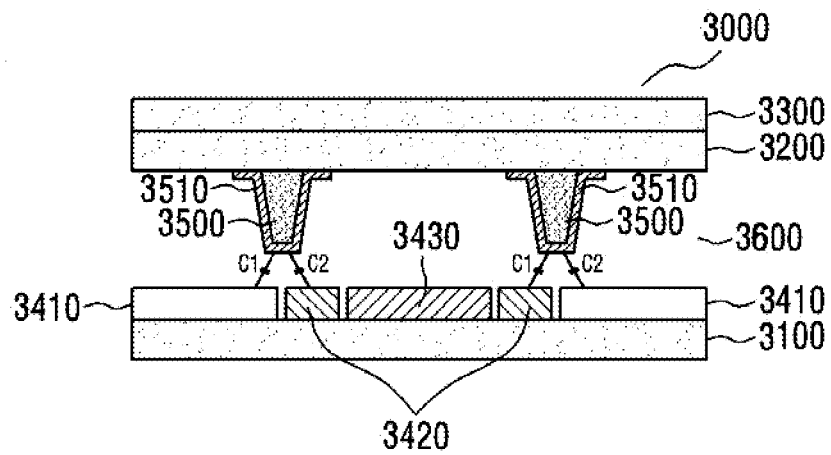
FIGS. 15b and 15c are structure views of touch pressure sensing and touch position sensing of the touch screen respectively in accordance with the fourth embodiment.
Figure 15C:
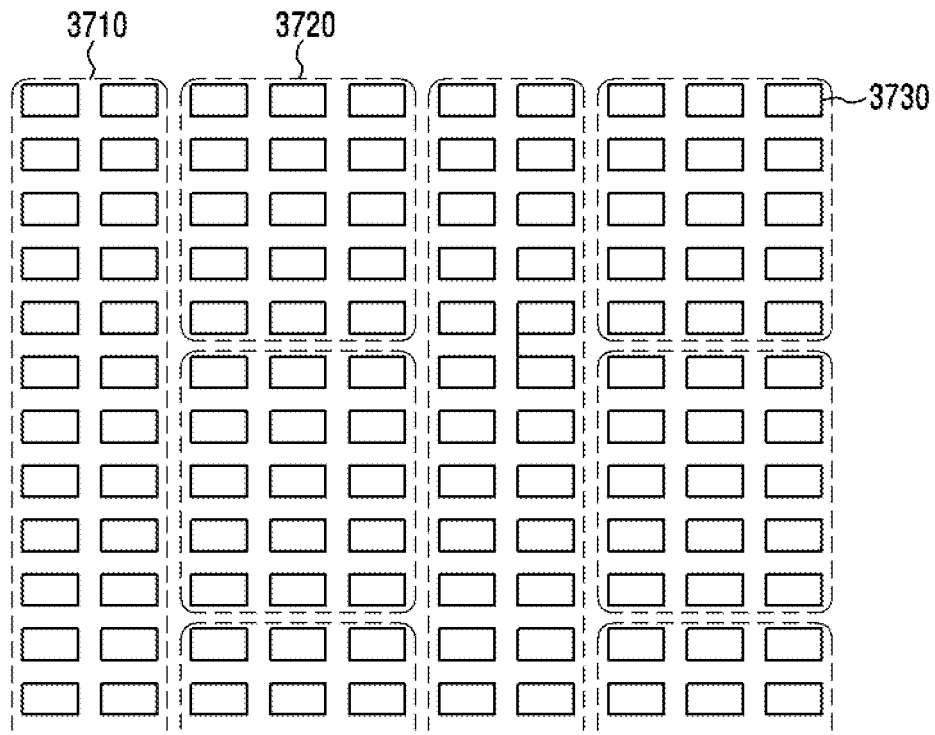

FIGS. 15*b* and 15*c* are structure views of touch pressure sensing and touch position sensing of the touch screen respectively in accordance with the fourth embodiment. FIGS. 15*b* and 15*c* take an LCD panel as an example of the display module 3000.

In case of the LCD panel, the display module 3000 may include a TFT layer 3100 and a color filter layer 3300. The TFT layer 3100 includes a TFT substrate layer 3110 disposed directly thereon. The color filter layer 3300 includes a color filter substrate layer 3200 disposed directly thereunder. The display module 3000 includes a liquid crystal layer 3600 between the TFT layer 3100 and the color filter layer 3300. Here, the TFT substrate layer 3110 includes electrical components necessary to generate an electric field driving the liquid crystal layer 3600. Particularly, the TFT substrate layer 3110 may be comprised of various layers including a data line, a gate line, TFT, a common electrode, a pixel electrode and the like. These electrical components generate a controlled electric field and orient the liquid crystals in the liquid crystal layer 3600.

As shown in FIG. 15*b*, the display module 3000 according to the embodiment of the present invention may include sub-photo spacers 3500 disposed on the color filter substrate layer 3200. These sub-photo spacers 3500 may be disposed on the interface between the low common electrode 3410 and the adjacent guard shield electrode 3420. Here, a conductive material layer 3510 like ITO may be patterned on the sub-photo spacer 3500. Here, a fringing capacitance C1 is formed between the low common electrode 3410 and the conductive material layer 3510, and a fringing capacitance C2 is formed between the guard shield electrode 3420 and the conductive material layer 3510.

When the display module 3000 shown in FIG. 15*b* functions as the touch pressure sensing module, a distance between the sub-photo spacers 3500 and the TFT substrate layer 3110 may be reduced by an external pressure, and thus, a capacitance between the low common electrode 3410 and the guard shield electrode 3420 may be reduced. Accordingly, in FIG. 15*b*, the conductive material layer 3510 functions as the reference potential layer and detects the change of the capacitance between the low common electrode 3410 and the guard shield electrode 3420, so that the touch pressure can be detected.

FIG. 15*c* shows a structure in which the LCD panel as the display module 3000 is used as the touch position sensing module. The arrangement of the common electrodes 3730 is shown in FIG. 15*c*. Here, for the purpose of detecting the touch position, these common electrodes 3730 may be divided into a first area 3710 and a second area 3720. Accordingly, for example, the common electrodes 3730 included in one first area 3710 may be operated in such a manner as to function in response to the first electrode 6400 of FIG. 16*c*, and the common electrodes 3730 included in one second area 3720 may be operated in such a manner as to function in response to the second electrode 6500 of FIG. 16*c*. That is, in order that the common electrodes 3730, i.e., electrical components for driving the LCD panel are used to detect the touch position, the common electrodes 3730 may be grouped. Such a grouping can be accomplished by a structural configuration and manipulation of operation.

As described above, in FIG. 15, the electrical components of the display module 3000 are caused to operate in conformity with their original purpose, so that the display module 3000 performs its own function. Also, at least some of the electrical components of the display module 3000 are caused to operate for detecting the touch pressure, so that the display module 3000 functions as the touch pressure sensing module. Also, at least some of the electrical components of the display module 3000 are caused to operate for detecting the touch position, so that the display module 3000 functions as the touch position sensing module. Here, each operation mode may be performed in a time-division manner. In other words, the display module 3000 may function as the display module in a first time interval, as the pressure sensing module in a second time interval, and/or as the position sensing module in a third time interval.

FIGS. 15*b* and 15*c* only show the structures for the detection of the touch pressure and the touch position respectively for convenience of description. So long as the display module 3000 can be used to detect the touch pressure and/or the touch position by operating the electrical components for the display operation of the display module 3000, the display module 3000 can be included in the fourth embodiment.

FIG. 1 is a structure view of the touch input device 100 according to an embodiment of the present invention. The device 100 according to the embodiment of the present invention may include a controller 110, the touch screen 130, and a processor 140.

Input to the touch input device 100 may be performed by touching the touch screen 130. The touch input device 100 according to the embodiment of the present invention may be a portable electronic device like a laptop computer, a personal digital assistant (PDA) and a smartphone. Also, the touch input device 100 according to the embodiment of the present invention may be a non-portable electronic device like a desktop computer, a smart television.

The touch screen 130 according to the embodiment of the present invention allows a user to operate a computing system by touching the screen with an object like a finger. In general, the touch screen 130 recognizes the touch on the panel and the computing system analyzes the touch and performs operations in accordance with the analysis.

The processor 140 according to the embodiment of the present invention can detect whether a touch occurs or not on the touch screen and the touch position when the touch occurs on the touch screen 130. Also, the processor 140 can measure the amount of the capacitance change occurring according to the touch when the touch occurs on the touch screen 130.

Specifically, through the touch position sensing module 1000 or the touch position-pressure sensing module 5000 of the touch screen 130, the processor 140 can measure capacitance change amount according to the approach of an object 10 to the touch screen 130 and can calculate the touch position from the measured capacitance change amount. Also, the processor 140 according to the embodiment can calculate the aforementioned touch position through the display module 3000 capable of detecting the touch position/touch pressure of the touch screen 130.

Also, the size of the capacitance change amount may be changed according to the touch pressure when the touch occurs. Therefore, when the touch occurs on the touch screen 130, the processor 140 can measure the size of the capacitance change amount according to the touch pressure. Here, the less the touch pressure becomes, the less the capacitance change amount becomes, and the greater the touch pressure becomes, the greater the capacitance change amount becomes.

Specifically, the processor 140 may measure the capacitance change amount caused by the pressure which is applied from the object 10 to the touch screen 130 through the touch pressure sensing module 2000, the touch position-pressure sensing module 5000 or the display module 3000 of the touch screen 130, which is capable of detecting the touch pressure, and may calculate the size of the touch pressure from the measured capacitance change amount.

Figure 2A:
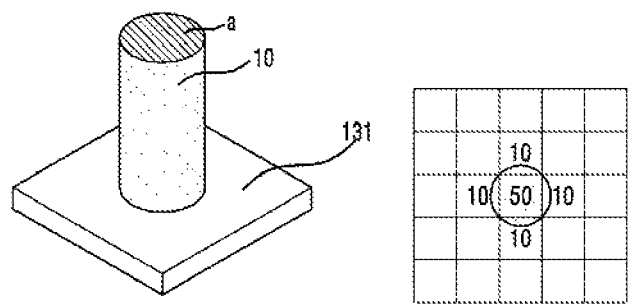
FIGS. 2a and 2b are views for describing a capacitance change amount due to pressure.
Figure 2B:
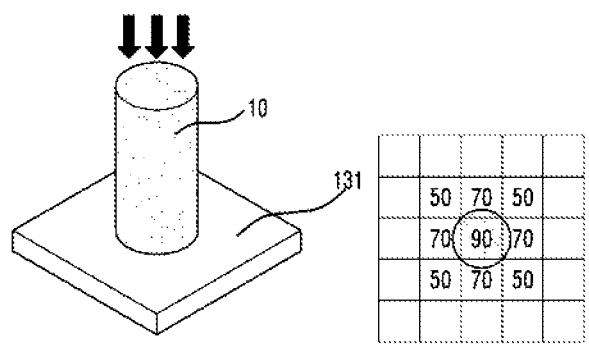

The capacitance change amount which is generated by the object 10 touching the touch screen 130 can be measured by summing the capacitance change amounts of each of a plurality of sensing cells. For example, as shown in FIG. 2a, when a common touch is input to the touch screen 130 by the object 10, the sum of the capacitance change amounts is 90. Also, as shown in FIG. 2b, when the touch with pressure is input to the touch screen 130 by the object 10, the sum of the capacitance change amounts may be 570 (=90+70+70+70+70+50+50+50+50).

Also, the processor 140 according to the embodiment of the present invention is able to recognize a hovering state in which the object like the finger is close enough to the touch screen 130 to cause the change of the capacitance in the touch screen 130 without touching directly the touch screen 130.

For example, when the object is located within about 2 cm from the surface of the touch screen 130, the processor 140 measures the capacitance change amount according to the approach of the object 10 to the touch screen 130 through the touch position sensing module 1000, the touch position-pressure sensing module 5000 or the display module 3000 of the touch screen 130, and then is able to calculate, from the measured capacitance change amount, whether or not the object exists and the where the object is located. In order that the movement of the object is recognized as hovering over the touch screen 130, it is desirable that the error of the capacitance change amount which is generated at the touch screen 130 by the hovering is larger than that of the capacitance change amount which is generated at the common touch screen 130.

As described above, the processor 140 may detect the capacitance change amount generated at the touch screen 130, may calculate whether the touch occurs or not, the touch position and the touch pressure size and/or may measure the capacitance change amount caused by the touch.

The measured capacitance change amount and at least any one of the touch position and touch pressure size calculated from the measured capacitance change amount is transmitted to the controller 110 by the processor 140. Here, the controller 110 may calculate a touch time period by using the capacitance change amount transmitted from the processor 140. According to the embodiment, the controller 110 may be an application processor. The application processor is able to perform the command interpretation, operation, and control, etc., in the portable electronic device.

Figure 3A:
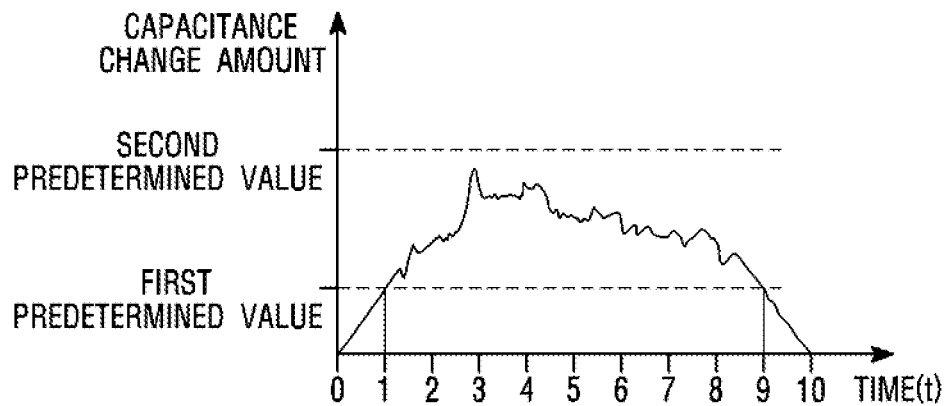
FIGS. 3a and 3b are views for describing a touch time period.

For example, the controller 110 measures a time period during which the capacitance change amount is maintained greater than a first predetermined value, and thus, calculates a time period during which the object touches the touch screen 130. When the capacitance change amount is less than the first predetermined value, the capacitance change amount is generally within an error range and the touch may not be recognized as a valid touch in the touch input device 100. For instance, FIG. 3a shows that a valid touch time period during which the capacitance change amount is maintained greater than the first predetermined value is 8t (1t to 9t). Here, the valid touch in FIG. 3a may include the hovering.

Figure 3B:
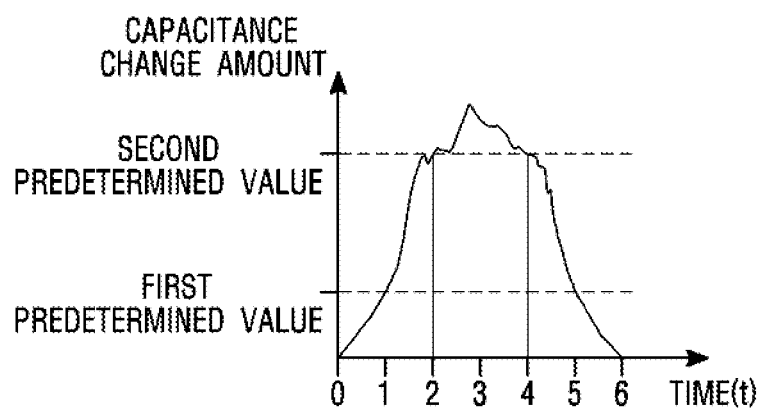

The controller 110 measures a time period during which the capacitance change amount is maintained greater than a second predetermined value, so that a time period during which a direct touch on the touch screen 130 is maintained can be calculated. For example, when the capacitance change amount is greater than the first predetermined value and is less than the second predetermined value, the touch may correspond to the hovering. According to the embodiment, when it is necessary to measure the time period of the direct touch except the hovering, the controller 110 is able to calculate the direct touch time period by measuring only the time period during which the capacitance change amount is greater than the second predetermined value. For example, it can be seen that the direct touch time period in FIG. 3b is 2t (2t to 4t).

As described above, in the touch input device 100 capable of detecting the touch pressure, the touch pressure may be recognized as mutually different inputs to the touch input device 100 in accordance with the level of the size of the touch pressure. For example, when the touch screen 130 is touched with a first touch pressure, the touch input device 100 may be set to perform a first operation. When the touch screen 130 is touched with a second touch pressure, the touch input device 100 may be set to perform a second operation.

Likewise, in the touch input device 100 capable of detecting the touch time period, the touch time period may be recognized as mutually different inputs to the touch input device 100 in accordance with the amount of the touch time period. For example, when the touch screen 130 is touched during a first touch time period, the touch input device 100 may be set to perform a third operation. When the touch screen 130 is touched during a second touch time period, the touch input device 100 may be set to perform a fourth operation.

In this specification, a basic touch input to the touch input device 100 may be designated as a tap touch. When the tap touch is input to the touch input device 100, a set operation according to the tap touch may be performed. A touch with a pressure greater than that of the tap touch may be designated as a pressure touch. When the pressure touch is input to the touch input device 100, a set operation according to the pressure touch may be performed. Here, it is apparent that a variety of operations can be set according to the size level of the pressure touch.

Likewise, a touch which lasts for a time period relatively longer than that of the tap touch may be designated as a long touch. When the long touch is input to the touch input device 100, a set operation according to the long touch may be performed. Here, it is clear that various operations can be set according to the amount of the touch time period of the long touch.

Here, when it is distinguished whether a touch is the pressure touch or the long touch in accordance with a criterion for distinguishing between the long touch and the pressure touch, an overlap between the pressure touch and the long touch may occur. For example, when a predetermined touch not only has a pressure greater than that of the tap touch but also lasts longer than the tap touch, the touch may be recognized as the long touch as well as the pressure touch.

Figure 4A:
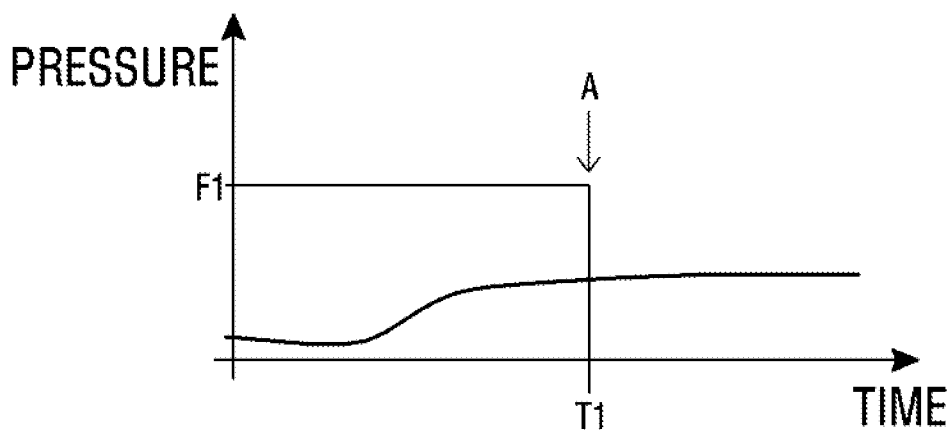
FIGS. 4a and 4b are graphs showing a long touch and a pressure touch respectively when the long touch and the pressure touch are confusing.
Figure 4B:
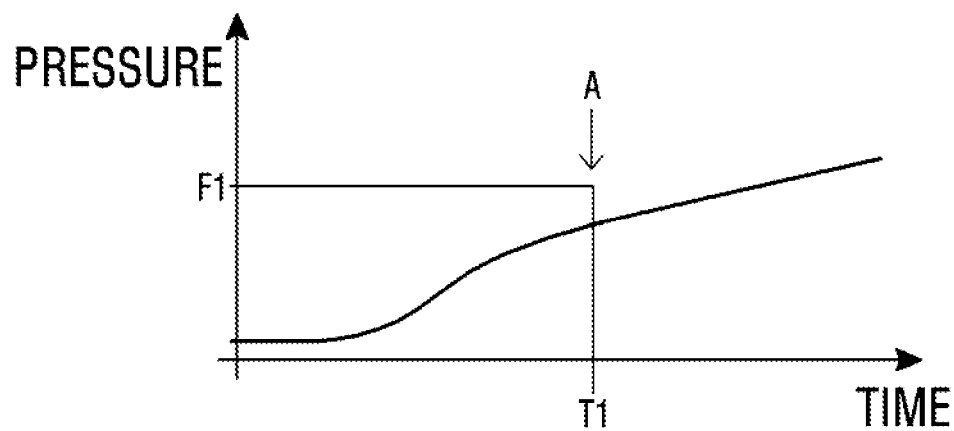

FIGS. 4a and 4b are graphs showing the long touch and the pressure touch respectively when the long touch and the pressure touch are confusing. As shown in FIG. 4a, when the touch is maintained longer than a first time period "T1", the touch on the touch input device 100 may be recognized as the long touch. Therefore, when it is confirmed that the touch is maintained longer than the first time period "T1", the touch input device 100 may perform an operation "A" corresponding to the long touch at a point of time "T1".

When a touch with a pressure greater than a first pressure "F1" occurs on the touch screen 130, the touch may be recognized as the pressure touch. Here, as shown in FIG. 4b, the user increases gradually the pressure of the touch on the touch screen 130 in order to perform the pressure touch. However, since the touch time period meets the long touch criterion at the point of time "T1", the touch is recognized as the long touch prior to being recognized as the pressure touch, the operation "A" corresponding to the long touch may be performed at the point of time "T1".

Therefore, for the purpose of overcoming this problem, the embodiment of the present invention provides a method for clearly distinguishing between the pressure touch and the long touch, an algorithm and a device of the same.

Figure 5:
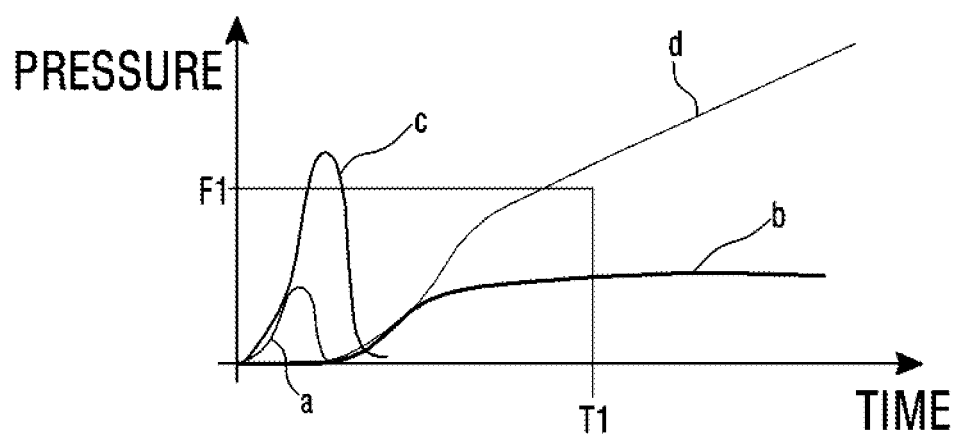
FIG. 5 is a graph showing touch types which are distinguished by a method for distinguishing between the long touch and the pressure touch in accordance with the embodiment of the present invention.

FIG. 5 is a graph showing touch types which are distinguished by a method for distinguishing between the long touch and the pressure touch in accordance with the embodiment of the present invention. FIG. 5 shows that "a" represents the tap touch, "b" represents the long touch, and "c" and "d" represent the pressure touch. A touch which has a touch time period less than the first time period "T1" and a pressure less than the first pressure "F1" may be set as the tap touch "a". A touch which is maintained for a time period longer than the first time period "T1" and is maintained at a pressure less than the first pressure "F1" within the first time period may be set as the long touch "b". Lastly, a touch which has a pressure greater than the first pressure "F1" within the first time period "T1" may be set as the pressure touch "c" and "d". Here, the pressure touch is not necessarily maintained for the first time period "T1", however, there may be a requirement for a time interval during which the touch has a pressure greater than the first pressure "F1" within the first time period "T1".

In the embodiment of the present invention, the touch type distinction between the tap touch, long touch and pressure touch may be made within the first time period "T1". When the touch type is distinguished within the first time period "T1", an operation according to the corresponding touch type may be performed. The operation according to the corresponding touch type may further need to meet conditions required for performing itself. The first time period "T1", i.e., a criterion time period for distinguishing the touch type can be determined by considering various items such as the sensitivity of the touch input device 100, a response speed aimed by the touch input device 100, a target error rate of the touch type distinction, and convenience for users, etc.

Figure 6:
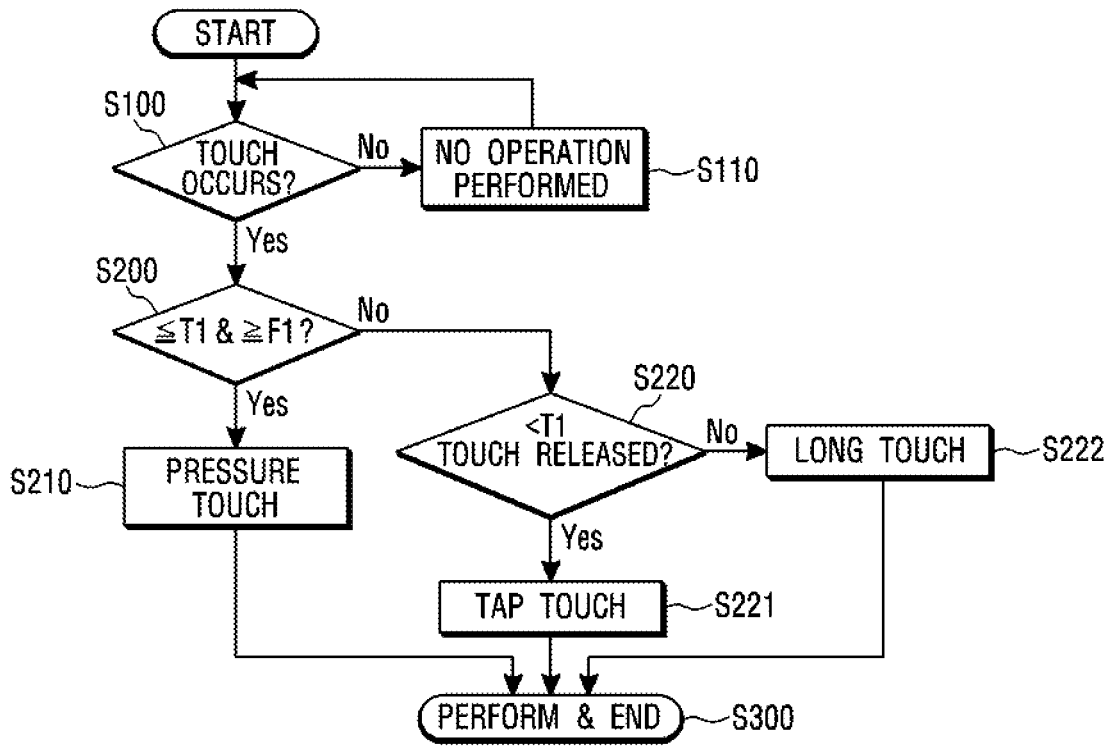
FIG. 6 is a flowchart showing the method for distinguishing between the long touch and the pressure touch in accordance with the embodiment of the present invention.

FIG. 6 is a flowchart showing the method for distinguishing between the long touch and the pressure touch in accordance with the embodiment of the present invention. The method for distinguishing between the long touch and the pressure touch in accordance with the embodiment of the present invention may be performed by the controller 110 or may be performed by another component such as the processor 140 in accordance with the embodiment.

First, on the basis of the capacitance change amount and/or touch information based on the capacitance change amount, which are transmitted from the processor 140, the controller 110 determines whether a touch occurs on the touch screen 130 or not (S100). Here, the touch information may include whether or not the touch occurs, touch position and/or touch pressure. Here, when the controller determines that there is no touch, any operation is not performed (S110), the step S100 of determining whether a touch occurs or not may be performed again. When a touch occurs in step S100, the controller 110 determines whether or not the touch includes a time interval during which the touch has a pressure greater than the first pressure "F1" within the first time period "T1" (S200). In step S200, when the controller determines that the touch includes a time interval during which the touch has a pressure greater than the first pressure "F1" within the first time period "T1", the touch may be distinguished as the pressure touch (S210). For example, in FIG. 5, "c" and "d" may be distinguished as the pressure touch. Accordingly, the controller 110 causes the touch input device 100 to perform the operation according to the pressure touch, and then the distinction of the touch type can be terminated (S300).

In step S200, when the controller determines that the touch does not include the time interval during which the touch has a pressure greater than the first pressure "F1" within the first time period "T1", the controller 110 determines whether or not the touch has been released before the point of the first time "T1" (S220). In step S220, when the controller determines that the touch has been released before the point of the first time "T1", the touch may be distinguished as the tap touch (S221). For example, in FIG. 5, "a" which represents that the touch is released before the point of the first time "T1" and the pressure of the touch does not increase greater than the first pressure "F1" before the point of the first time "T1" may be distinguished as the tap touch. Accordingly, the controller 110 causes the touch input device 100 to perform the operation according to the tap touch, and then the distinction of the touch type can be terminated (S300).

In step 220, when the controller 110 determines that the touch has not been released before the point of the first time "T1", the touch may be distinguished as the long touch (S222). For example, in FIG. 5, "b" which represents that the touch is not released before the point of the first time "T1" and the pressure of the touch does not increase greater than the first pressure "F1" before the point of the first time "T1" may be distinguished as the long touch. Accordingly, the controller 110 causes the touch input device 100 to perform the operation according to the long touch, and then the distinction of the touch type can be terminated (S300).

Here, the operation according to the touch type distinguished as the pressure touch, tap touch and/or long touch may be set to be performed when additional conditions set by the touch input device 100 are satisfied.

The touch input device 100 including the touch screen 130 according to the embodiment of the present invention may further include a memory 120. The memory 120 may store operations set according to the first time period "T1", the first pressure "F1", and the touch type. The controller 110 according to the embodiment of the present invention is able to perform the determining algorithm with reference to the memory 120.

In order that the user of the touch input device 100 which can perform the determination algorithm as described above performs the pressure touch without being confused with the long touch, the user is required to perform a touch with a pressure greater than the first pressure "F1" within the first time period "T1". However, the size of the first pressure "F1", i.e., the distinguishing criterion, may not be appropriate according to the age, physical conditions, and situations of the user. For example, the first pressure "F1" is less than the force of a healthy man's hand. Therefore, even when the user intends to perform the long touch, the user fails to control the force, so that the touch may be recognized as the pressure touch. Or, the first pressure "F1" is much greater than the force of a child's hand. Therefore, even when the user intends to perform the pressure touch, the user fails to touch with a pressure greater than the first pressure "F1", so that the touch may be recognized as the long touch.

In the embodiment of the present invention, to overcome this problem, the size of the first pressure "F1", i.e., the criterion for distinguishing the pressure touch, can be controlled and set. For example, in the touch input device 100 according to the embodiment of the present invention, the first pressure "F1" may be set as a default value in the memory 120. The user is able to change and set the first pressure "F1" if necessary.

Figure 7A:
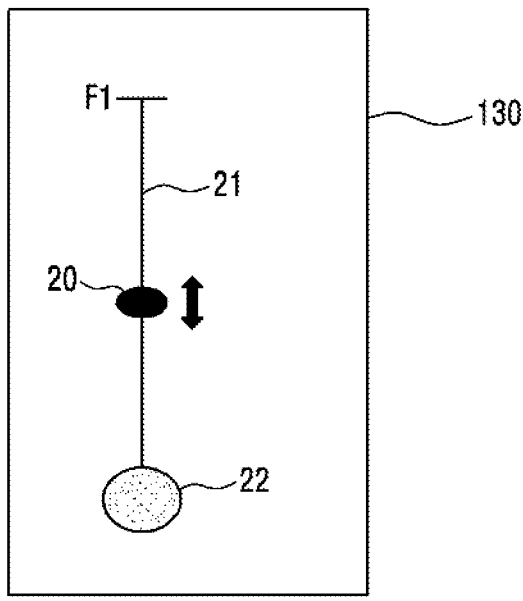
FIGS. 7a and 7b show a method for adjusting a criterion for distinguishing between the long touch and the pressure touch in the touch input device according to the embodiment of the present invention.
Figure 7B:
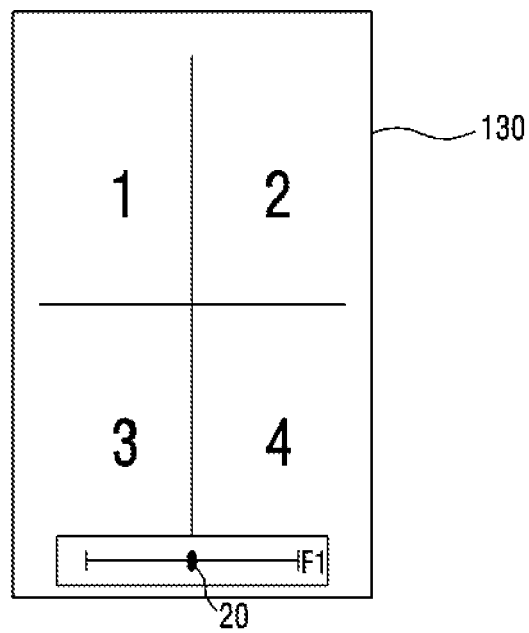

FIGS. 7*a* and 7*b* show a method for adjusting the criterion for distinguishing between the long touch and the pressure touch in the touch input device according to the embodiment of the present invention.

As shown in FIG. 7*a*, a screen for setting the first pressure "F1" may be displayed on the touch screen 130. In FIG. 7*a*, the user may press a touch input area indicated by a reference numeral 22 in order to set the first pressure "F1" that he/she wants. Here, a moving circle 20 may move on a bar 212 in accordance with the size of the touch pressure of the user. The user may press the touch input area 22 until the touch pressure reaches his/her desired pressure level. The user may hold the pressing of the touch input area 22 at the corresponding pressure level for a predetermined period of time so as to set his/her own desired pressure level as the first pressure "F1", and then may release the pressing. As a result, the first pressure "F1" can be set as the corresponding pressure. This is just an example. The user is allowed to set the first pressure "F1" in the touch input device 100 in various ways. This set details may be stored in the memory 120.

According to the embodiment of the present invention, the screen of the touch screen 130 may be divided, and the first pressure "F1" may be set separately and/or differently for each divided screen. FIG. 7*b* shows that the screen of the touch screen 130 is divided into four and the first pressure "F1" is set for the divided screens 1, 2, 3, and 4 respectively. For example, a divided screen where the first pressure "F1" is set is selected and then the moving circle 20 is moved to a desired level of the first pressure "F1", so that the first pressure "F1" of the divided screen can be set. This setting process can be applied in the same manner to the remaining divided screens. Here, several or all the divided screens of the plurality of divided screens 1, 2, 3, and 4 are selected, and then the first pressure "F1" may be simultaneously set in the same manner. Here, the divided screen can be selected by touching the corresponding divided screen. Then, the size of the first pressure "F1" may be set by moving the moving circle 20.

The setting of the first pressure "F1" for the divided screens of the touch screen 130 shown in FIG. 7*b* is just an example. The first pressure "F1" can be set for the divided screens of the touch screen 130 through a variety of implementation methods. The setting of the first pressure "F1" for each divided screen may be made according to the method described with reference to FIG. 7*a*.

Although preferred embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A touch input device which comprises a touch screen and is configured to perform mutually different operations with respect to a first touch which occurs on the touch screen and is maintained during a time period equal to or greater than a first time period, wherein the first touch is maintained at a pressure less than a first pressure within the first time period, and a second touch which occurs on the touch screen and comprises a time interval having a pressure greater than the first pressure within the first time period; and which is configured to perform an operation, different from the operations corresponding to the first touch and the second touch, with respect to a third touch which occurs on the touch screen and is maintained during a time period less than the first time period, and the third touch is maintained at a pressure less than the first pressure while the third touch is maintained.

2. The touch input device according to claim 1, wherein the first pressure is controlled and set by an input to the touch screen.

3. The touch input device according to claim 1, wherein the first pressure is separately controlled and set for each of a plurality of divided screens of the touch screen.

4. The touch input device according to claim 1, wherein the predetermined pressure is separately controlled and set for each of a plurality of divided areas of the touch screen.

5. A method for distinguishing a touch type in a touch input device comprising a touch screen, the method comprising:
- processing, with a programmable processor, a signal from a touch screen, the signal being generated in response to a touch on the touch screen;
- determining whether the touch on the touch screen comprises a time interval during which the touch has a pressure greater than a first pressure within a first time period;
- distinguishing the touch type in accordance with whether or not the touch comprises a time interval during which the touch has a pressure greater than the first pressure within the first time period, distinguishing the touch type comprising:
  - distinguishing the touch as a pressure touch when the touch comprises the time interval during which the touch has the pressure greater than the first pressure within the first time period;
  - distinguishing the touch as a tap touch when the touch is released within the first time period without comprising the time interval during which the touch has the pressure greater than the first pressure within the first time period; and
  - distinguishing the touch as a long touch when the touch is not released within the first time period without comprising the time interval during which the touch has the pressure greater than the first pressure within the first time period; and
- performing a different operation according to the distinguished touch type.

6. The method according to claim 5, further comprising a pre-process in which a user of the touch input device sets the first pressure.

7. The method according to claim 6, wherein the pre-process in which a user of the touch input device sets the first pressure comprises a step in which the user sets separate first pressures for a plurality of divided areas of the touch screen.

8. A touch input device capable of distinguishing a touch type, the touch input device comprising:
- a touch screen; and
- a controller configured to:
  - determine whether a touch on the touch screen comprises a time interval during which the touch has a pressure greater than a first pressure within a first time period; and
  - distinguish the touch type in accordance with whether or not the touch comprises a time interval during which the touch has a pressure greater than the first pressure within the first time period, distinguishing the touch type comprising:
    - distinguishing the touch as a pressure touch when the touch comprises the time interval during which the touch has the pressure greater than the first pressure within the first time period;
    - distinguishing the touch as a tap touch when the touch is released within the first time period without comprising the time interval during which the touch has the pressure greater than the first pressure within the first time period; and
    - distinguishing the touch as a long touch when the touch is not released within the first time period without comprising the time interval during which the touch has the pressure greater than the first pressure within the first time period; and
  - perform a different operation according to the distinguished touch type.

9. The touch input device according to claim 8, wherein the controller further performs a pre-process in which a user of the touch input device sets the first pressure.

10. The touch input device according to claim 9, wherein the pre-process in which a user of the touch input device sets the first pressure comprises a step in which the user sets separate first pressures for a plurality of divided areas of the touch screen.

11. A touch input device comprising:
- a touch screen, wherein a touch on the touch screen is associated with a touch pressure which extends over a time interval; and
- a controller configured to:
  - identify the touch as a first touch type when the time interval is less than a predetermined time interval and the touch pressure over the time interval remains less than a predetermined pressure, and in response to identifying the touch as the first touch type, perform a first operation;
  - identify the touch as a second touch type when the touch pressure exceeds the predetermined pressure at any point over the time interval, and in response to identifying the touch as the second touch type, perform a second operation;
  - identify the touch as a third touch type when the time interval is equal to or greater than the predetermined time interval and the touch pressure over the predetermined time interval remains less than the predetermined pressure, and in response to identifying the touch as the third touch type, perform a third operation; and
- wherein the first, second, and third operations are different from each other.

12. The touch input device according to claim 11, wherein the predetermined pressure is controlled and set by an input to the touch screen.

* * * * *